(12) United States Patent
Forman et al.

(10) Patent No.: US 7,130,620 B2
(45) Date of Patent: Oct. 31, 2006

(54) TELECOMMUNICATIONS SERVICES AND APPARATUS REGARDING LOST CONNECTIVITY EVENTS

(75) Inventors: George H. Forman, Port Orchard, WA (US); Henri Jacques Suermondt, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 560 days.

(21) Appl. No.: 10/193,562

(22) Filed: Jul. 11, 2002

(65) Prior Publication Data

US 2004/0203645 A1   Oct. 14, 2004

(51) Int. Cl.
*H04M 3/42* (2006.01)
(52) U.S. Cl. ............... 455/414.2; 455/432.3; 455/445; 455/451
(58) Field of Classification Search ......... 455/413, 455/416, 417, 517, 412.1, 412.2, 414, 445, 455/412; 379/202.01
See application file for complete search history.

(56) References Cited

U.S. PATENT DOCUMENTS

| | | | | |
|---|---|---|---|---|
| 5,752,185 A | * | 5/1998 | Ahuja | 455/414.1 |
| 5,887,249 A | * | 3/1999 | Schmid | 455/411 |
| 5,982,858 A | * | 11/1999 | Carter et al. | 379/88.26 |
| 2003/0134617 A1 | * | 7/2003 | Duerk et al. | 455/412 |
| 2004/0203424 A1 | * | 10/2004 | Akhteruzzaman et al. | 455/67.11 |
| 2004/0203855 A1 | * | 10/2004 | Veerasamy et al. | 455/456.1 |
| 2004/0204041 A1 | * | 10/2004 | Fillebrown et al. | 455/556.1 |

FOREIGN PATENT DOCUMENTS

WO    WO 9723963 A2 *  7/1997

* cited by examiner

*Primary Examiner*—Gerald Gauthier

(57) ABSTRACT

A telecommunications system and operations technique associated with unintentionally disconnected wireless communications. When a call is severed other than intentionally by the parties, value-added options are provided automatically. Recorded messages, call-backs, and similar options are appropriately distributed among the parties to the severed call. A method of doing business and appropriate system equipment and programming is described.

15 Claims, 3 Drawing Sheets

TELECOMMUNICATIONS SERVICES AND APPARATUS REGARDING LOST CONNECTIVITY EVENTS

(2) CROSS-REFERENCE TO RELATED APPLICATIONS

Not Applicable.

(3) STATEMENT REGARDING FEDERALLY SPONSORED RESEARCH OR DEVELOPMENT

Not Applicable.

(4) REFERENCE TO AN APPENDIX

Not Applicable.

(5) BACKGROUND OF THE INVENTION (5.1) Field of the Invention

The present invention relates generally to telecommunications and connectivity services.

(5.2) Description of Related Art

Wireless telecommunications has become important for both business and personal use. FIG. 1A (Prior Art) illustrates an exemplary wireless communications device, a cellular radiotelephone 30 (hereinafter referred to using the common term "cellphone 30"). An antenna 31 sends and receives telecommunication signals 32. The cellphone 30 includes a memory 34a, having programming 34b. A transceiver 36 is provided for transmitting and receiving cellular communications signals via a base station (see FIG. 1B description below). A processor 38 controls the operations and provides an interface between other elements of the cellphone 30, namely a keypad 40, microphone 42, speaker 44, and display 45.

FIG. 1B (Prior Art) depicts a cellular telephone service system 18. There are a plurality of base stations 20A, 20B, 20C wherein each base station defines a respective cell 21A, 21B, 21C. There is at least one mobile switching center 22 connected (illustrated by straight lines) to a subscriber data base 24, a message center 26, and an activation center 27. Each of the base stations 20A–20C conforms to an industry standard (e.g., IS-56B) and sends and receives telecommunication signals (illustrated by lightning-bolt type lines) to and from the message center 26 and subscriber cellphones 30. In addition, the cellular system 18 is also preferably connected via the mobile switching center 22 with a public switched telephone network (PSTN) 28 (sometimes referred to in the art as a "land line telephone network"). Under normal operations, the system 18 provides telecommunications to and from subscriber cellphones 30 within a respective cell 20A–20C according to an industry standard such as IS-136. The system 18 supports telecommunications both between a cellphone 30 and the PSTN 28 to land line telephones or another subscriber cellphone. Note that known manner satellite telecommunications can be similarly described.

When a signal 32 between a cellphone 30 and a base station 20A, 20B, 20C fades due to distance from the base station 20A or due to signal interference by man-made structures or geographic features between the cellphone and the base station, relay towers, relay satellites, or the like, an on-going call is often cut off, or "dropped." This results in customer frustration at both ends of the connection and perhaps added costs to re-establish communication between the parties to the dropped call. One solution has been for the cellphone service providers to credit customers who take the time to complain about a dropped call. This is overhead for all parties concerned.

(6) BRIEF SUMMARY OF THE INVENTION

The present invention provides a value-added service and apparatus for customers who have just experienced an unexpected disconnection.

The foregoing summary is not intended to be an inclusive list of all the aspects, objects, advantages and features of the present invention nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

(7) BRIEF DESCRIPTION OF THE DRAWINGS

Like reference designations represent like features throughout the drawings. The drawings referred to in this specification should be understood as not being drawn to scale except if specifically annotated.

(8) DETAILED DESCRIPTION OF THE INVENTION

Figure 1A:
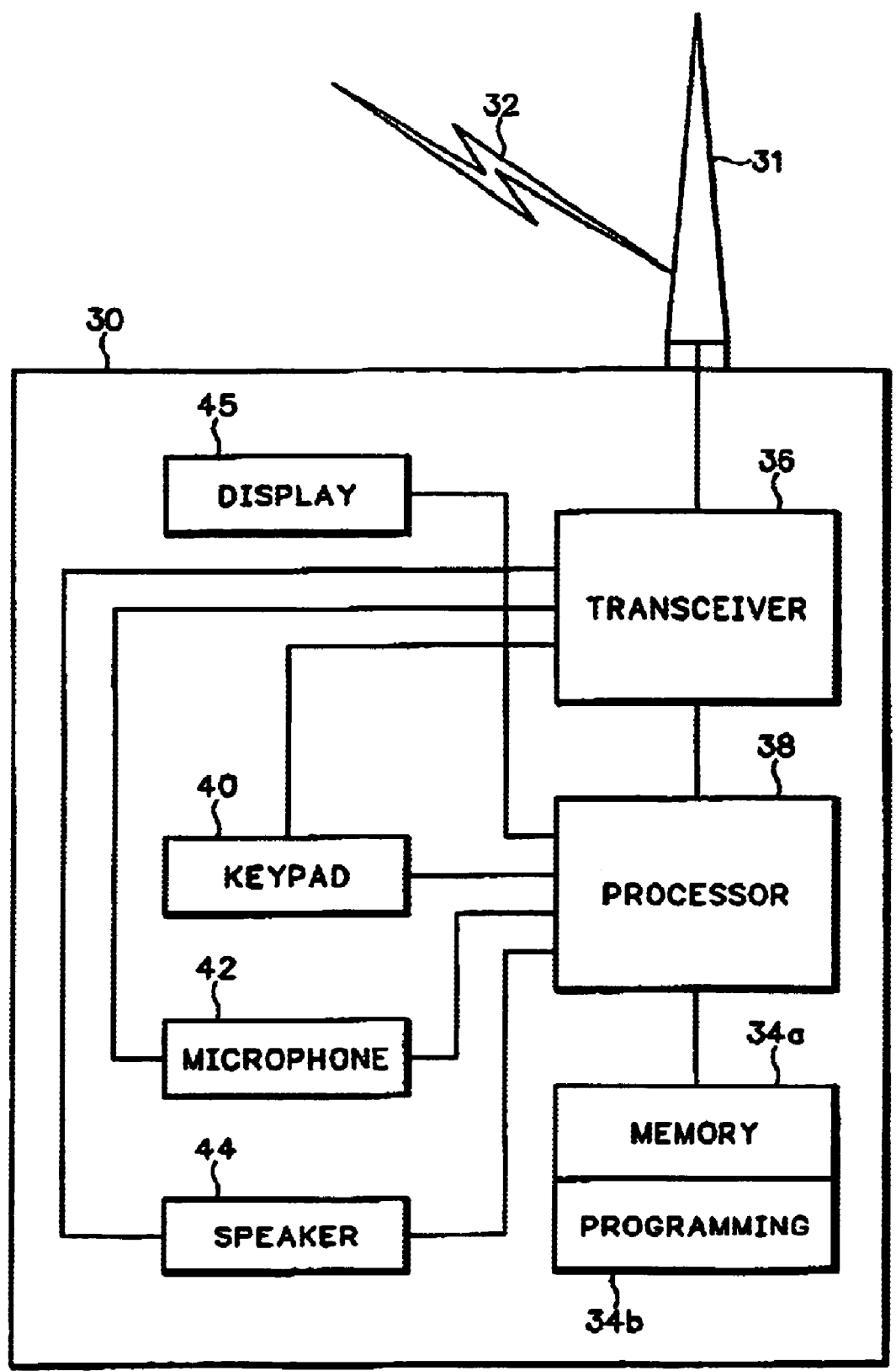
FIG. 1A (Prior Art) is a block diagram schematic for a cellular radiotelephone apparatus.
Figure 1B:
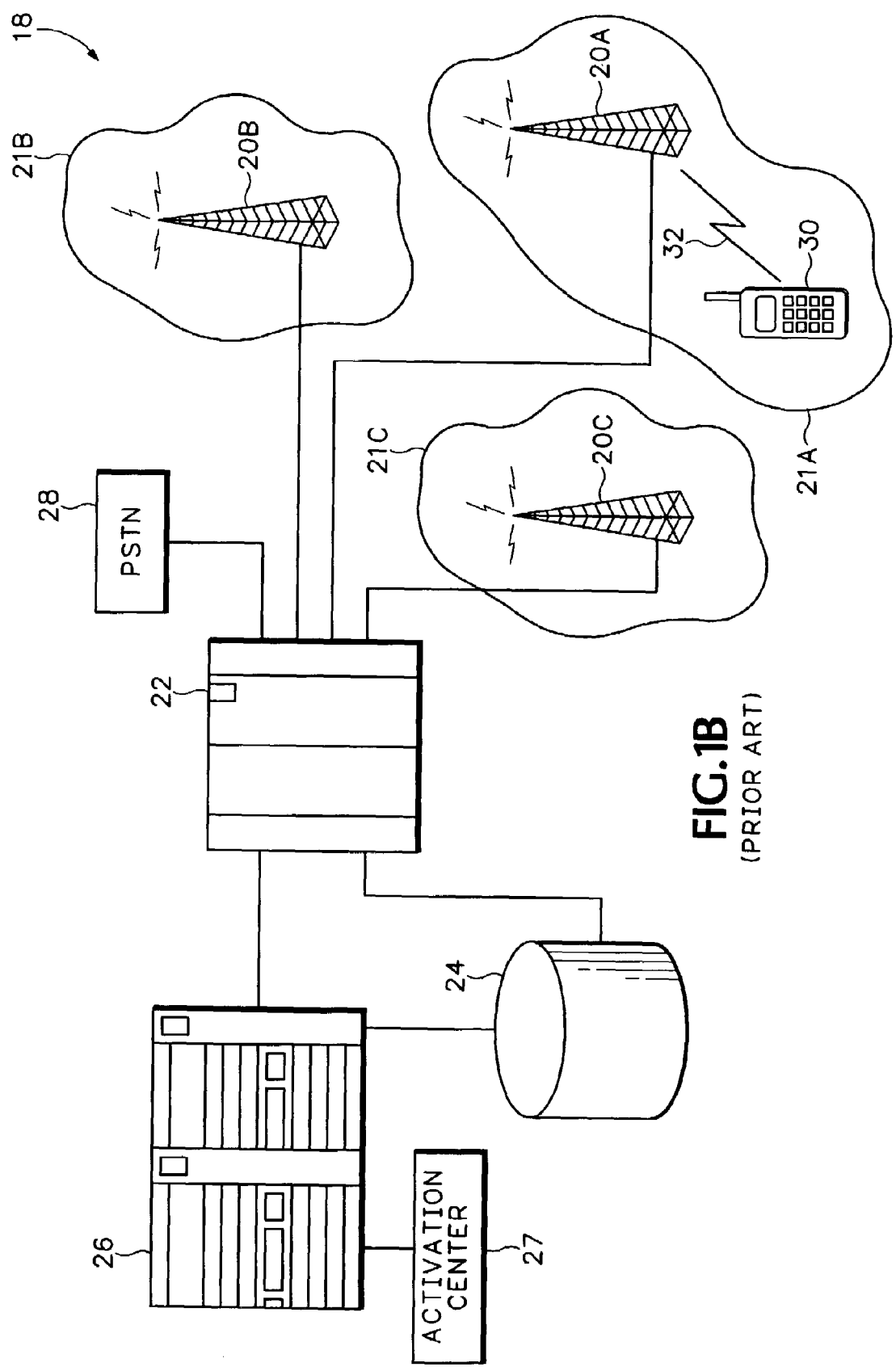
FIG. 1B (Prior Art) is a schematic illustration of a cellular telecommunications system.
Figure 2:
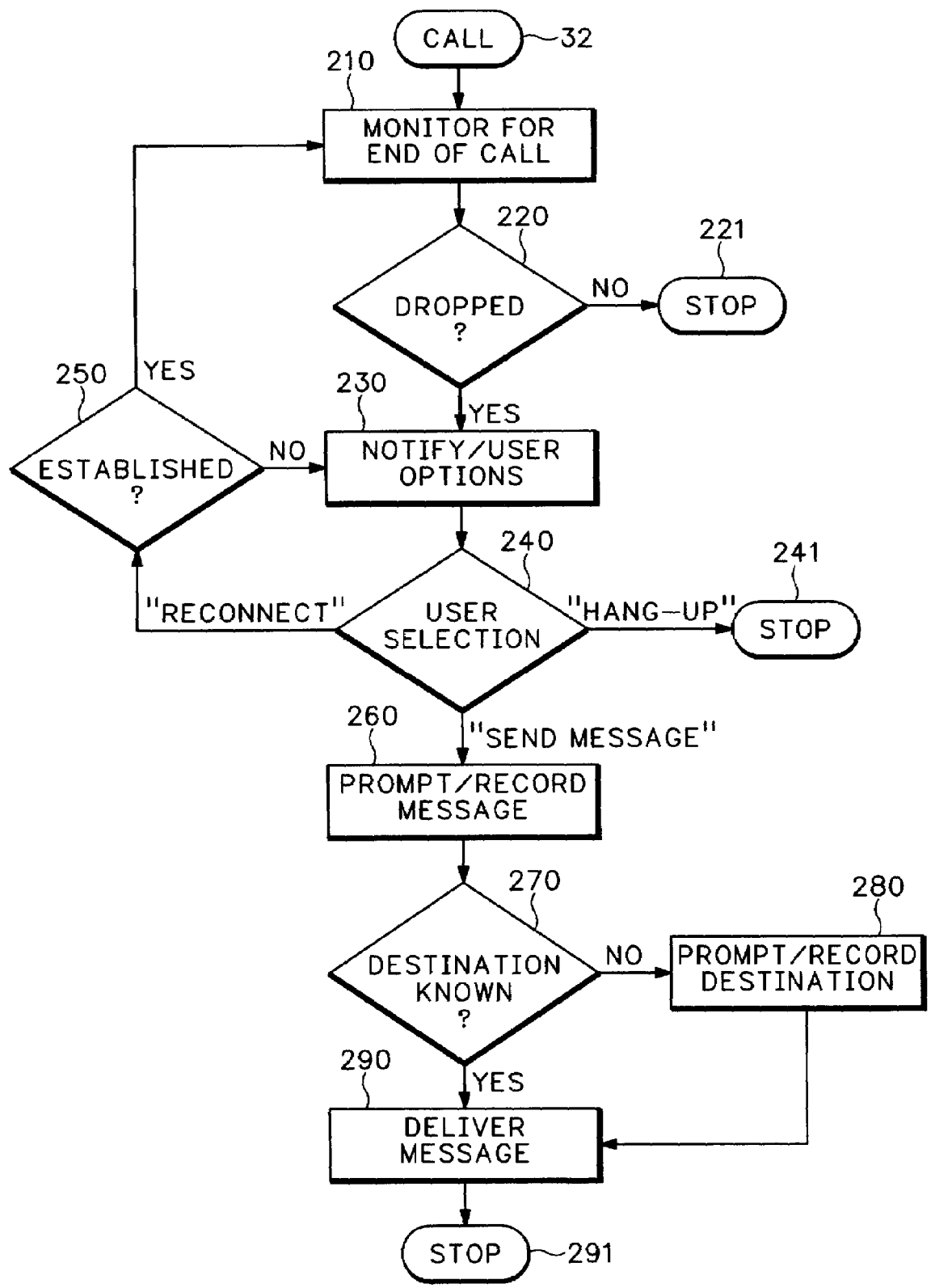
FIG. 2 is a flowchart of a value-added service operation according to an embodiment of the present invention.

Turning also to FIG. 2, it is assumed that a cellular phone call is in progress 32. Programming 34b for the operating system of the cellphone 30 monitors the call-in-progress 210 for the end of the call. If the call is through the PSTN 28, namely from a cellphone to a land line telephone (not shown), the cellular provider service also monitors the call-in-progress with respect to signal strength to the extent necessary to determine if a call was terminated intentionally or unintentionally due to signal fade; in other words, to determine if the call was unintentionally dropped.

If a call is normally terminated, 220, NO-path, the process is not employed, STOP 221. Whenever a call is dropped 220, YES-path, each party receives 230 a notification that the call was dropped. The notification can be in a variety of forms, for example, a pre-recorded audio message or an on-screen text message. For example, with respect to each involved cellphone 30, the drop notification is programmed into the cellphones' programming 34b associated with the processor 38. For example, with respect to a land line phone, a connection from the PSTN 28 can be maintained by the monitoring provider service, or a related service, and the notification provided.

User options 230 are also provided. For example, a recorded message might announce, "Your call has been disconnected. Press 1 to attempt to reconnect; press 2 to send a message; or, you may simply hang-up." The user makes a selection 240. A "HANG-UP" (see so-labeled path of the flowchart of FIG. 2) simply terminates the process 241. If the user attempts a "RECONNECT" option, the service programming will determine if signal strength is sufficient for restoring a connection. As an option, the service may predetermine if the call is potentially restorable before offering the reconnection option; an announcement regarding signal strength, range, roaming charges, and the like may be provided. The variations for these steps may be dependent upon several factors and tailored to any specific implementation. If there is the potential to restore the signal strength, 250, YES-path, (e.g., when an automobile cellphone call fades and drops a call while passing under a bridge), an attempt is made 250. If connection is not re-established, the user is again notified and given the set of options 230. As generalized examples, if the call is between a cellphone and a land line telephone, the option may be provided to both parties or solely to the cellphone user; if the call is between two cellphones, the option may be provided to one or both, preferably to the initial caller; if call blocking is involved, a callback number may not be available, and such parties may be left out of the process. Other options in accordance with the state of the art and instruments involved can be tailored to any specific implementation in accordance with proprietary software of the provider and needs of their customers. If the call 32 connection is re-established 250, YES-path, the process again monitors for the end of call 210. Note that in the state of the art, if the cellular provider is able to restore the wireless signal, then the parties may be instantly reconnected if they are both still on the line. If the cellphone user has hung up, the unit will ring just as when placing a new call. If the land line user has hung up, a re-call can be placed only if their number is known, i.e., if the cellphone user dialed the original call or else the land line caller provided caller-identification information. If unsuccessful 250, NO-path, a failure notification is provided and the process loops through the restoration/messaging subroutines 230 again. If reconnection is successful 250, YES-path, the process loops to monitoring 210 the call.

The other option given 240, "SEND MESSAGE"-path, is to allow the caller to leave an electronically recorded message 260, e.g., "press 2 to leave a voicemail." Note that the "press 1 . . . " and "press 2 . . . " and the like options generally are given automatically and sequentially in a known manner. As an example of another option, a known manner electronic text message might be sent by the participant. When this option is selected, the user is given appropriate prompts, if any, e.g., "Please record your message after the tone." and the message is recorded 260.

A check 270 is made to determine whether there is a known destination for the message. If not 270, NO-path, another notification and option 280 must be given, e.g., "Please enter a destination telephone number." Note that for the cellphone party, if the call was an in-coming call and caller-identification information was not available (e.g., an international call), then in order to leave voice mail, the user needs to provide the destination telephone number. Otherwise, the number of the land line party should be known automatically. For the land line party, the process is being handled by the cellular provider, knowing the number of the cell phone even when a known manner caller-identification routine has call blocking; the user would need to provide a different destination telephone number if the cellphone user does not have activated voice mail.

In another option, the cellular provider may simply provide an automatic reconnect service. That is, e.g., by monitoring the signal strength and connection activity, if a call is dropped, the system simply connects the participants, ringing any participant that has hung-up following the unintentional disconnect event.

Thus, at flowchart connection 240, the user has selected one of three options to the experience of the dropped call; (1) the user can simply leave the call terminated, 240 "HANG-UP"-path; (2) attempt the reconnection, 240 "RECONNECT"-path, or (3) attempt to leave a message, 240 "SEND MESSAGE"-path. Other options may be provided in accordance with a specific implementation.

If the user selection is to send a voice mail 240, "SEND MESSAGE"-path, a prompt (e.g., "Please record after the tone") and recording cycle is executed in a state of the art known manner. The user is again prompted for delivering the message. For a land line party, the message is delivered to the cellphone's voicemail mailbox. For the cellphone party the message is delivered to a queue of outgoing messages stored 34a on-board the cellphone. Later, namely when signal strength is restored, the cellphone can automatically or manually initiate the transfer of the message. Preferably, the cellphone would automatically connect to the cellular service provider and deliver the message to an outbound queue of messages. This allows the cellphone to minimize its connection time, battery expenditure, and complexity of operations. The cellular service provider then delivers the queue of outbound messages via one or more outbound calling devices in a state of the art known manner. The message is then delivered 290, ending 291 the process.

In an alternative embodiment, the system and technique described hereinabove can be applied to other kinds of synchronous communication where a connection between parties can be lost, for example, text-mode chat over the Internet. In wireless Internet communication devices, a message to the user can offer to send a message to the other party when connection with that party is next restored.

Note that it is envisioned that the system and technique can be expanded and adapted by appropriate programming for conference calling between more than two parties on more than two instruments.

A provider can offer the system capability and technique described herein as a distinguishing feature of their method of doing business, optionally charging one or both parties for its use either as a subscribed regular feature or on a one-time charge.

The foregoing description of exemplary and preferred embodiments of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . ."

The invention claimed is:

1. Telecommunication service method comprising:
   conducting a telephone call between participants; and
   in response to the telephone call being disconnected for a reason other than a hang-up event, prompting a first participant, from among the participants, to send a message to at least one other of the participants,
   wherein the message is stored on a telephone being used by the first participant until telephone service is restored and subsequently transferred to the at least one other of the participants when telephone service is restored.

2. The method as set forth in claim 1, further comprising:
   determining the reason for the telephone call being disconnected by monitoring a wireless communication between the participants for signal fade disconnect events.

3. The method as set forth in claim 1 wherein said message is selected from voicemail messaging or electronic text messaging or video messaging.

4. The method as set forth in claim 1, wherein the first participant is a cell phone user whose wireless connection has been terminated.

5. The method as set forth in claim 1, wherein the at least one other of the participants who receives the message comprises a person who initiated the telephone call and who uses caller-identification blocking.

6. Telecommunications services method comprising:
   determining a disconnect of a telephone call between participants is due to a reason other than a hang-up event; and
   automatically in response to said determination, querying a first participant, from among the participants, as to whether said first participant would like to transmit a message to an other one of said participants,
   wherein the message is stored on a telephone being used by the first participant until telephone service is restored and subsequently transferred to the other one other of the participants when telephone service is restored.

7. The method as set forth in claim 6, wherein the other one of the participants who receives the message initiated the telephone call and uses caller-identification blocking.

8. A telecommunications device, comprising:
   means for determining if active connectivity with a telecommunication provider, during a telephone call, has been severed due to a signal fade event;
   means for automatically giving a user of the device, in response to said determination, an option to send a message without re-establishing immediate connectivity with the telecommunication provider;
   means for recording and storing said message; and
   means for sending said message following re-connectivity between said device and said telecommunication provider.

9. A telecommunications device according to claim 8, wherein said means for sending the message automatically sends the message following re-connectivity between said device and said telecommunication provider.

10. Telecommunications services method comprising:
    determining a disconnect of a telephone call between participants is due to a reason other than a hang-up event; and
    automatically in response to said determination, querying at least one of said participants as to whether said at least one of said participants would like to transmit a message to an other one of said participants,
    wherein the reason for the disconnect is a signal fade event which terminates a wireless connection of a telephone being used by said at least one of said participants, and wherein said telephone identifies the signal fade event and, in response, queries said at least one of said participants as to whether said at least one of said participants would like to transmit a message to said other one of said participants.

11. A method for execution by a telecommunications device, comprising:
    determining if active connectivity between a telecommunications device and a telecommunication provider, during a telephone call, has been severed due to a signal fade event;
    automatically giving a user of the telecommunications device, in response to said determination, an option to send a message without re-establishing immediate connectivity with the telecommunication provider;
    recording and storing said message on the telecommunications device until connectivity between said telecommunications device and said telecommunication provider is restored; and
    sending said message from the telecommunications device following re-connectivity between said telecommunications device and said telecommunication provider.

12. A method according to claim 11, wherein said message automatically is sent following re-connectivity between said telecommunications device and said telecommunication provider.

13. A telecommunication device for conducting telephone calls, comprising components configured to:
    conduct a telephone call with an other party via a telecommunication provider;
    determine if active connectivity with the telecommunication provider, during the telephone call, has been severed for a reason other than a hang-up event;
    automatically provide a user of said telecommunication device, in response to said determination, an option to send a message to said other party without re-establishing immediate connectivity with the telecommunication provider;
    record and store said message; and
    send the message for delivery to the other party following re-connectivity between said telecommunication device and said telecommunication provider.

14. A telecommunication device according to claim 13, wherein said message automatically is sent following re-connectivity between said telecommunication device and said telecommunication provider.

15. A telecommunication device according to claim 13, wherein said message is selected from voicemail messaging or electronic text messaging or video messaging.

* * * * *